United States Patent [19]

Lee

[11] Patent Number: 5,917,477
[45] Date of Patent: *Jun. 29, 1999

[54] TOUCH SCREEN INPUT APPARATUS FOR CHIP MOUNTER, CHIP MOUNTER INCLUDING THE SAME AND METHOD FOR CONTROLLING THE CHIP MOUNTER

[75] Inventor: Jong-ho Lee, Suwon, Rep. of Korea

[73] Assignee: Samsung Electronics Co., Ltd., Suwon-city, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/807,683

[22] Filed: Feb. 28, 1997

[51] Int. Cl.$^6$ ........................................ G09G 5/00
[52] U.S. Cl. ................................ 345/173; 345/1; 345/173
[58] Field of Search .................... 345/1, 2, 156, 345/173, 174, 123, 180, 157, 179, 526, 516; 348/15

[56] References Cited

U.S. PATENT DOCUMENTS

| | | | |
|---|---|---|---|
| 5,450,323 | 9/1995 | Maupillier et al. | 364/424.06 |
| 5,534,914 | 7/1996 | Flohr et al. | 348/15 |
| 5,561,446 | 10/1996 | Montlick | 345/173 |
| 5,581,269 | 12/1996 | Butcher | 345/1 |
| 5,657,046 | 8/1997 | Noble et al. | 345/123 |

FOREIGN PATENT DOCUMENTS

| | | |
|---|---|---|
| 60-44282 | 3/1985 | Japan . |
| 61-260301 | 11/1986 | Japan . |
| 62-298801 | 12/1987 | Japan . |
| 4-280303 | 10/1992 | Japan . |
| 5-19841 | 1/1993 | Japan . |
| 6-245280 | 9/1994 | Japan . |
| 6-250729 | 9/1994 | Japan . |

*Primary Examiner*—Jeffery A. Hofsass
*Assistant Examiner*—Davetta Woods
*Attorney, Agent, or Firm*—Burns, Doane, Swecker & Mathis, L.L.P.

[57] ABSTRACT

A touch screen input apparatus including a plurality of touch screens, a chip mounter provided with the apparatus, and a method for controlling the chip mounter are provided which improve the capability of controlling the chip mounter. The touch screen input apparatus of a chip mounter comprises a plurality of monitors dispersedly disposed in the vicinity of the chip mounter to provide display screens for inputting the letter or numeral, a touch panel attached to each monitor for recognizing a touched coordinate on each display screen and outputting an electrical signal, priority order and release time controlling means for receiving the signals output from the touch panels and recognizing the order of generation thereof, and a multiplexer for receiving the signals output from the touch panels and sequentially selecting and outputting the input signals according to the order recognized by the priority order and release time controlling means. The touch screen input apparatus includes the monitors and the touch screen which are located at different places in order to control the chip mounter, thereby improving the operational capability of the chip mounter.

4 Claims, 3 Drawing Sheets

5,917,477

TOUCH SCREEN INPUT APPARATUS FOR CHIP MOUNTER, CHIP MOUNTER INCLUDING THE SAME AND METHOD FOR CONTROLLING THE CHIP MOUNTER

BACKGROUND OF THE INVENTION

The present invention relates to a touch screen input apparatus for a chip mounter, and more particularly, to an apparatus having a plurality of touch screens, a chip mounter including the same and a method for controlling the chip mounter.

A chip mounter is an apparatus for mounting different-sized chip components on a printing circuit board (PCB). Control of the chip mounter requires an input of a numeral or a letter. The input apparatus includes a keyboard, a touch screen, etc.

In a touch screen method, a letter, a numeral, or a switch is displayed on a monitor screen. When an operator touches a desired portion of the display with his or her finger, a touch panel and a touch controller which are installed in the vicinity of a monitor screen detect the coordinate of the touched portion and recognize the input content, thus obtaining the same effect as in using a keyboard or a switch as the input apparatus.

A conventional touch screen input apparatus uses only one touch screen and a chip mounter employing the apparatus is difficult to operate when a mounting line thereof is long. For example, in a chip mounter such as a surface mounting device (SMD) line having a length of 10m or more, when an error is generated on the chip mounter, the operator must turn around the line and go up to a touch screen in order to solve the error, which causes time loss and inconvenience of manipulation.

Referring to FIG. 1, a conventional touch screen input apparatus includes: a controlling portion 10 which is operated by a predetermined program; a monitor controlling portion 12 for generating a video signal corresponding to a screen to be displayed on a monitor 16 according to an instruction of the controlling portion 10; a buffer 14 for supplying the video signal output from the monitor controlling portion 12 to the monitor 16; a touch panel 18 attached to the monitor 16, for detecting a touched coordinate of a display screen, converting the coordinate into an electrical signal and outputting the converted signal; a line driver 20 for transmitting the electrical signal output from the touch panel 18; and a touch controlling portion 22 for receiving the electrical signal transmitted by the line driver 20, converting it into a touch coordinate, and providing the result to the controlling portion 10. In general, a touch screen is constituted by the touch panel 18, the line driver 20 and the touch controlling portion 22.

The apparatus shown in FIG. 1 includes a monitor and a touch panel attached thereto, so that a chip mounter can be controlled only from the place where the monitor 16 is positioned. Therefore, when a process line is long, the capability of operating the chip mounter is lowered.

SUMMARY OF THE INVENTION

To solve the above problems, it is an object of the present invention to provide a touch screen input apparatus which allows easy manipulation of a chip mounter from different locations.

It is another object of the present invention to provide a method for effectively controlling the chip mounter provided with the above input apparatus.

To accomplish the first object, there is provided a touch screen input apparatus comprising a plurality of monitors dispersedly disposed in the vicinity of the chip mounter to provide display screens for inputting the letter or numeral, a touch panel attached to each monitor for recognizing a touched coordinate on each display screen and outputting an electrical signal, priority order and release time controlling means for receiving the signals output from the touch panels and recognizing the order of generation thereof, and a multiplexer for receiving the signals output from the touch panels and sequentially selecting and outputting the input signals according to the order recognized by the priority order and release time controlling means.

To accomplish the second object, there is provided a method for controlling a chip mounter comprising the steps of: displaying a screen showing a letter or numeral on a plurality of monitors; recognizing the order of generation of coordinate signals generated by touch panels attached to the plurality of monitors; selecting and outputting the coordinate signals output from the touch panels according to the order recognized in the recognizing step; and determining the touched letter or numeral from the coordinate signals output in the selection and output step, and controlling the chip mounter in response to the determined letter or numeral.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
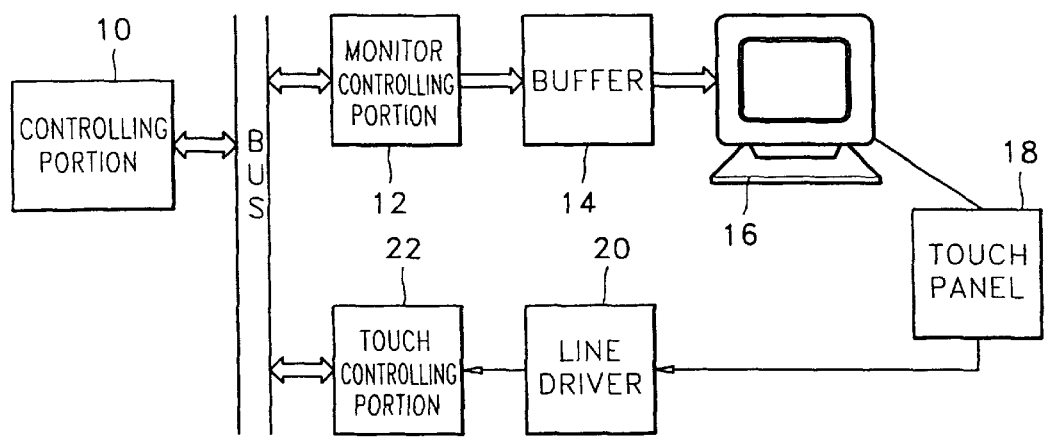
FIG. 1 is a block diagram showing the configuration of a chip mounter including a conventional touch screen input apparatus.
Figure 2:
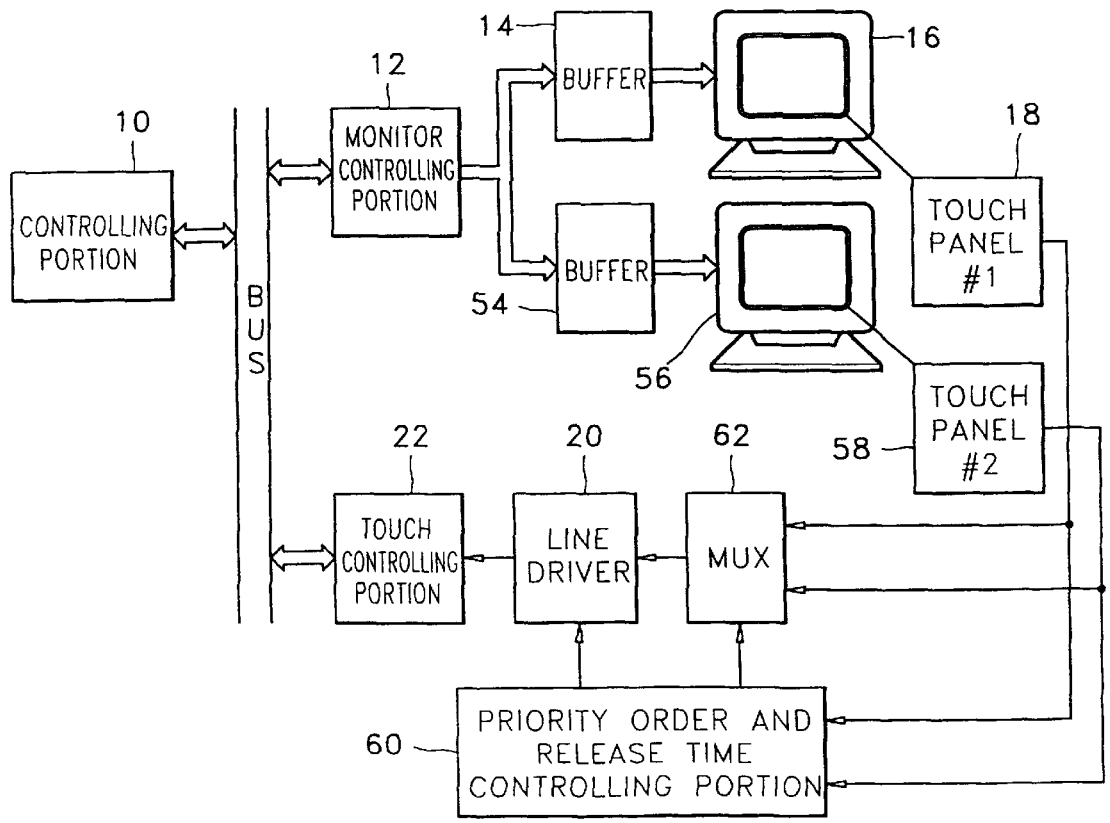
FIG. 2 is a block diagram showing the configuration of a touch screen input apparatus according to an embodiment of the present invention.

Referring to FIG. 2, a touch screen input apparatus according to an embodiment of the present invention includes: a controlling portion 10, a monitor controlling portion 12, a monitor 16, a buffer 14, a touch panel 18, a line driver 20 and a touch controlling portion 22, as in the conventional apparatus shown in FIG. 1, and further includes an extra buffer 54, an extra monitor 56, an extra touch panel 58, a multiplexer 62, and a priority order and release time controlling portion 60.

In the apparatus shown in FIG. 2, reference numerals 10 to 22 represent the same components as indicated by reference numerals 10 to 22 in FIG. 1.

The priority order and release time controlling portion 60 recognizes the order in which electrical signals are output from the first and second touch panels 18 and 58, and determines the effective time (release time) of each electrical signal.

The multiplexer 62 sequentially selects and outputs the electrical signals from the first and second touch panels 18 and 58 according to the order recognized by the priority order and release time controlling portion 60.

The operation of the apparatus shown in FIG. 2 will now be described in detail. A monitor controlling portion 12 generates a video signal corresponding to a screen to be displayed on the first and second monitors 16 and 56 according to an instruction of the controlling portion 10 which is operated by a predetermined program. The video signal output from the monitor controlling portion 12 is transmitted through the first and second buffers 14 and 54 and displayed on the first and second monitors 16 and 56.

When the first and second monitors 16 and 56 are touched, the first and second touch panels 18 and 58 output the touched coordinates as electrical signals.

The electrical signals output from the first and second touch panels 18 and 58 are transmitted to the priority order and release time controlling portion 60 and the multiplexer 62. The priority order and release time controlling portion 60 recognizes the order in which the electrical signals being input thereto are generated, controls the selection output of the multiplexer 62 according to the recognized order, and controls the effective period (release time) of the electrical signals.

The multiplexer 62 sequentially selects and outputs the applied electrical signals according to the control of the priority order and release time controlling portion 60. The electrical signals output from the multiplexer 62 are supplied to the controlling portion 10 through the line driver 20 and the touch controlling portion 22. The controlling portion 10 recognizes the touched coordinate from the electrical signals and controls the operation of a chip mounter according to the recognized touched coordinate.

When a user touches a specific point on a screen displayed on the first monitor 16, the first touch panel 18 recognizes the coordinate and outputs an electrical signal. The priority order and release time controlling portion 60 receives the electrical signal, determines that the first monitor 46 was touched, and outputs an instruction for the electrical signal generated from the first touch panel 18 to be output to the multiplexer 62.

When the user touches a specific point on a screen displayed on the second monitor 56, the second touch panel 58 recognizes the coordinate and outputs an electrical signal. The priority order and release time controlling portion 60 receives the output electrical signal, determines that the second monitor 56 was touched, and outputs an instruction for an electrical signal generated from the second touch panel 58 to be output to the multiplexer 62.

When the first and second monitors 16 and 56 are simultaneously touched, only the electrical signal generated from one of the touch panels is output according to a predetermined priority order, e.g., priority of the first monitor 16.

Figure 3:
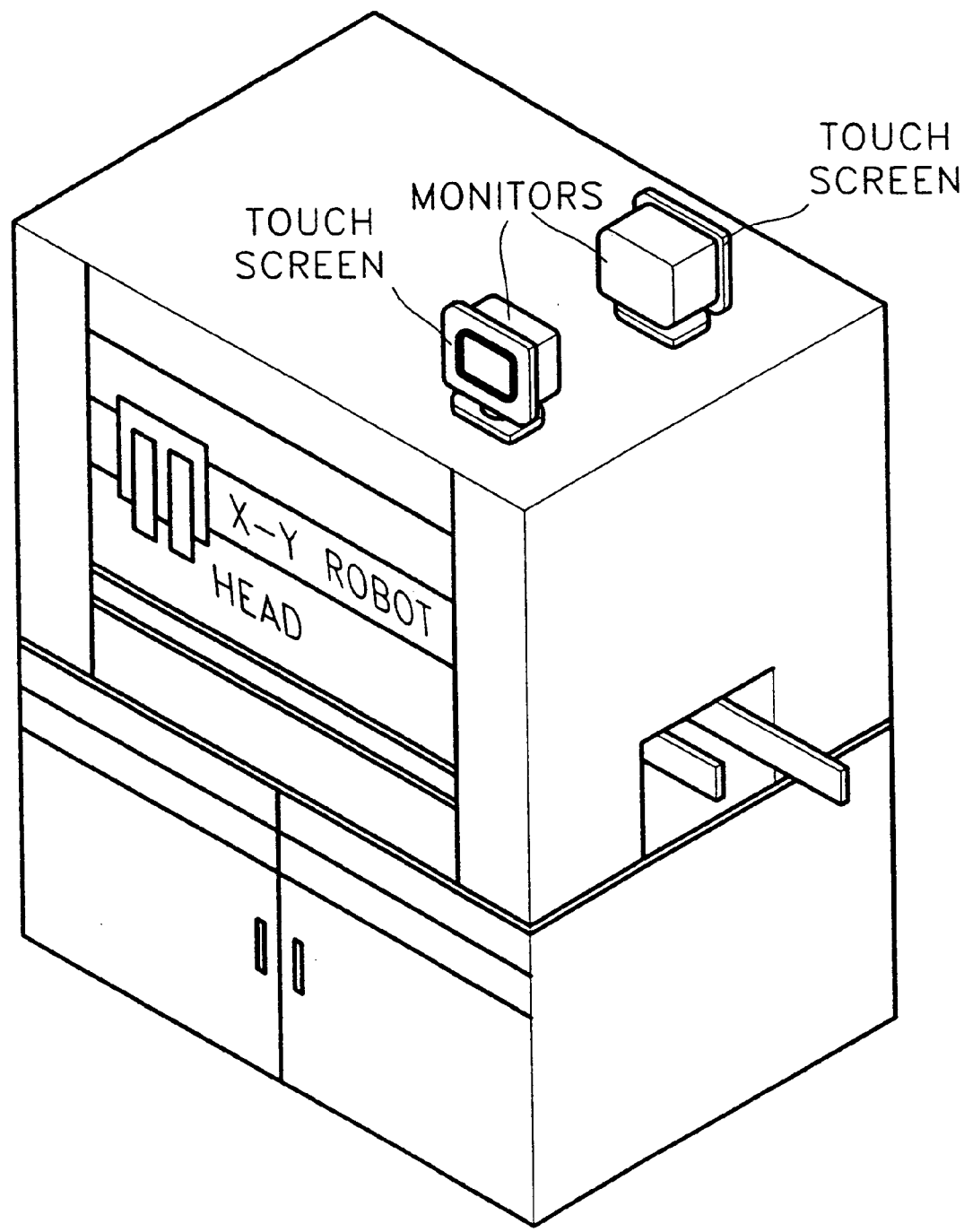
FIG. 3 is a perspective view of a chip mounter provided with the apparatus shown in FIG. 2.

FIG. 3 shows the external appearance of a chip mounter including the apparatus shown in FIG. 2. As can be seen from the drawing, the first and second monitors 16 and 56 and the touch screens are installed on the front and rear sides of the chip mounter, respectively. As described above, since the touch screens are located at different portions of the chip mounter, it is possible to control the chip mounter from different places.

Figure 4:
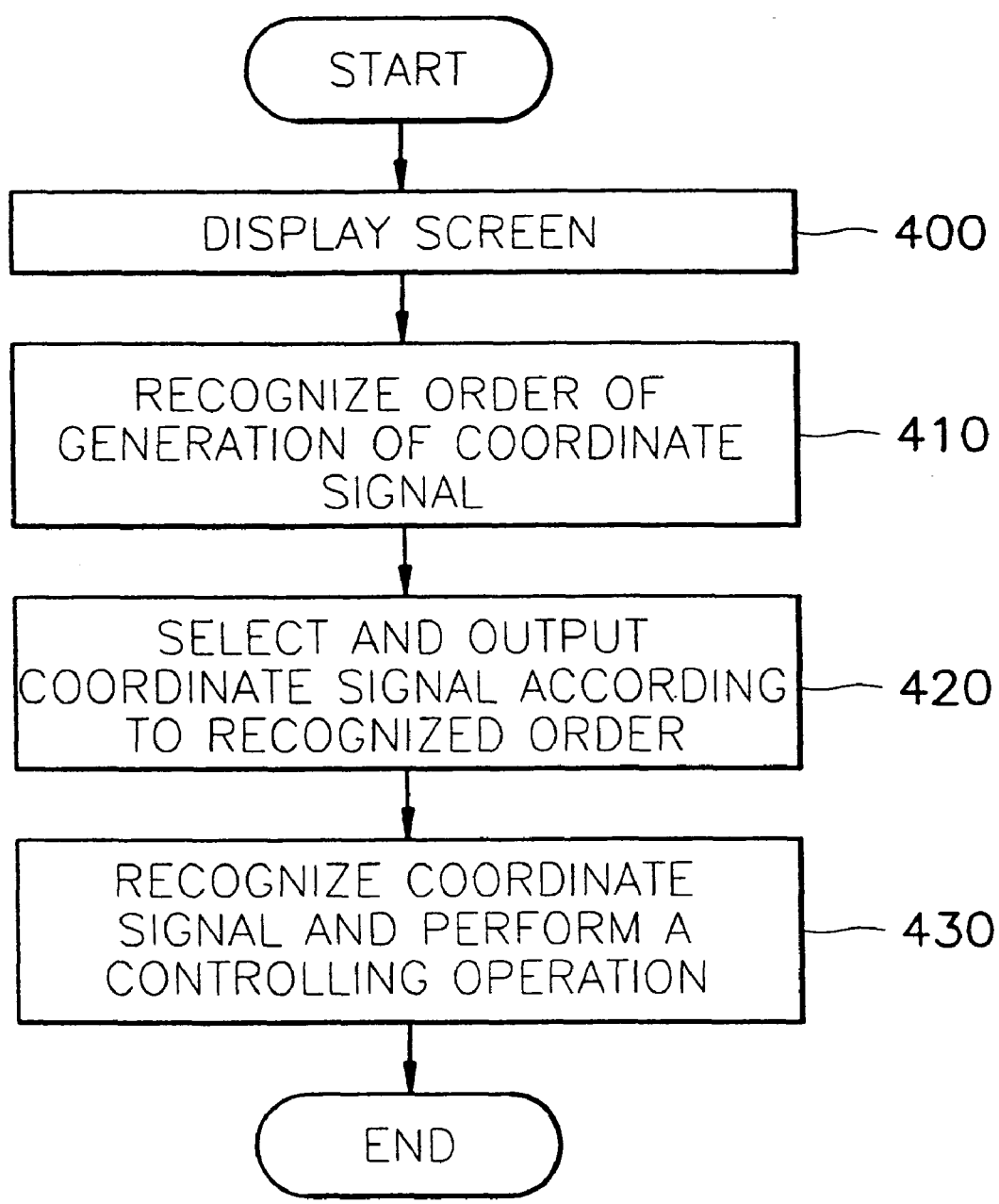
FIG. 4 is a flowchart outlining a method for controlling the chip mounter according to the present invention.

FIG. 4 is a flowchart outlining a process for controlling the chip mounter including the apparatus shown in FIG. 2. The process outlined in FIG. 4 includes: a displaying step 400; a recognizing step 410; a selectively-outputting step 420; and a controlling step 430. First, in the displaying step 400, a letter or a numeral is displayed on the screens of the first and second monitors 16 and 56. Here, the displayed screens are generated from the monitor controlling portion 12 according to the instruction from the controlling portion 10 of FIG. 2.

In step 410, the order in which coordinate signals generated from the first and second touch panels 18 and 58 is recognized. In general, the recognition is carried out according to the order of generation. However, when the coordinate signals are simultaneously generated, the recognition is carried out according to a predetermined priority order.

In step 420, the coordinate signals generated from the first and second touch panels 18 and 58 are selected by the multiplexer 62 to be output according to the order recognized in the recognizing step 410.

In step 430, the touched letter or numeral is recognized from the coordinate signals output in the selective outputting step 410, and the chip mounter is controlled in response to the letter or numeral selected.

As described above, the touch screen input apparatus according to the present invention includes the monitors and touch screens which are located at different places in order to control the chip mounter, thereby improving the operational capability of the chip mounter.

What is claimed is:

1. A touch screen input apparatus for inputting indicia to a chip mounter, comprising:

a plurality of monitors dispersedly disposed in the vicinity of said chip mounter to provide display screens for inputting the indicia;

a touch panel attached to each said monitor for recognizing a touched coordinate on each display screen and outputting an electrical signal;

priority order and release time controlling means for receiving said signals output from said touch panels and recognizing the order of generation thereof; and a multiplexer for receiving said signals output from said touch panels and sequentially selecting and outputting said input signals according to the order recognized by said priority order and release time controlling means.

2. A touch screen input apparatus as claimed in claim 1, further comprising a line driver for receiving a signal output from said multiplexer, and touch controlling means for receiving said signal output from said line driver and decoding the touched coordinate therefrom.

3. A chip mounter for receiving indicia through a touch screen input apparatus, said touch screen input apparatus comprising:

a plurality of monitors dispersedly disposed in the vicinity of said chip mounter to provide display screens for inputting the letter or numeral;

a touch panel attached to each said monitor for recognizing a touched coordinate on each display screen and outputting the detected coordinate as an electrical signal;

priority order and release time controlling means for receiving said signals output from said touch panels and recognizing the order of generation thereof; and a multiplexer for receiving said signals output from said touch panels and sequentially selecting and outputting said input signals according to the order recognized by said priority order and release time controlling means.

4. A touch screen input apparatus as claimed in claim 3, further comprising a line driver for receiving a signal output from said multiplexer, and touch controlling means for receiving said signal output from said line driver and decoding the touched coordinate therefrom.

* * * * *